(12) United States Patent
Mills (10) Patent No.: US 10,589,835 B2
(45) Date of Patent: Mar. 17, 2020

(54) FLOOR PANEL FASTENER ASSEMBLY (71) Applicant: The Boeing Company, Chicago, IL (US)

(72) Inventor: Christopher J. Mills, Charleston, SC (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 15/473,282

(22) Filed: Mar. 29, 2017

(65) Prior Publication Data
US 2018/0281921 A1 Oct. 4, 2018

(51) Int. Cl.
*B64C 1/18* (2006.01)
*F16B 19/10* (2006.01)
*F16B 37/04* (2006.01)
*F16B 37/14* (2006.01)

(52) U.S. Cl.
CPC ............ *B64C 1/18* (2013.01); *F16B 19/1081* (2013.01); *F16B 37/043* (2013.01); *F16B 37/14* (2013.01)

(58) Field of Classification Search
CPC ...... B64C 1/18; F16B 37/043; F16B 19/1081; F16B 37/14
See application file for complete search history.

(56) References Cited

U.S. PATENT DOCUMENTS

| | | | |
|---|---|---|---|
| 2,403,247 A | 7/1946 | Sullivan | |
| 2,607,447 A | 8/1952 | Tuttle | |
| 2,892,376 A | 6/1959 | Schonfeld | |
| 3,922,946 A | 12/1975 | Grayson | |
| 4,399,642 A | 8/1983 | Bard et al. | |
| 4,478,546 A | 10/1984 | Mercer | |
| 4,479,621 A | 10/1984 | Bergholz | |
| 4,537,542 A * | 8/1985 | Pratt | B25B 31/005 24/607 |
| 4,577,450 A | 3/1986 | Large | |
| 4,934,885 A * | 6/1990 | Woods | F16B 5/0233 24/453 |

(Continued)

FOREIGN PATENT DOCUMENTS

| | | |
|---|---|---|
| AU | 2003278751 A1 | 5/2004 |
| CA | 2497054 A1 | 5/2004 |

(Continued)

OTHER PUBLICATIONS

U.S. Appl. No. 60/357,292, filed Feb. 15, 2002 by Travis McClure, 7 pages.

(Continued)

*Primary Examiner* — Valentina Xavier
(74) *Attorney, Agent, or Firm* — Kolisch Hartwell, P.C.

(57) ABSTRACT

A fastener assembly for attaching a floor panel to an airframe is disclosed. The fastener assembly includes a collet, a pin, a capnut, and a subplate. The collet comprises at least one tang, extending from a cylindrical collar that defines a collet aperture. An external thread is formed on the collar, and a tab is formed on a distal end of the tang. The collet tang extends through a floor panel aperture, a subplate aperture, and an airframe aperture, and may interact with a subplate asymmetry. The capnut is screwed onto the collet, such that the pin is forced to slide along the collet tang and the tab is engaged with the airframe.

20 Claims, 4 Drawing Sheets

(56) References Cited

U.S. PATENT DOCUMENTS

| | | | |
|---|---|---|---|
| 4,975,014 A | 12/1990 | Rufin et al. | |
| 5,090,857 A | 2/1992 | Dunn | |
| 5,164,154 A * | 11/1992 | Brown | G21C 3/335 |
| | | | 376/364 |
| 5,634,754 A | 6/1997 | Weddendorf | |
| 5,788,443 A | 8/1998 | Cabahug | |
| 6,264,412 B1 | 7/2001 | Nakamura et al. | |
| 6,290,445 B1 | 9/2001 | Duran et al. | |
| 6,474,920 B2 | 11/2002 | Lin | |
| 6,595,734 B2 | 7/2003 | Duran et al. | |
| 7,300,042 B2 | 11/2007 | McClure | |
| 7,338,013 B2 | 3/2008 | Vetillard et al. | |
| 7,967,251 B2 | 6/2011 | Wood | |
| 7,988,395 B2 | 8/2011 | Steffier | |
| 8,075,234 B2 | 12/2011 | McClure | |
| 8,342,787 B2 | 1/2013 | Smith | |
| 8,360,362 B2 | 1/2013 | Kismarton et al. | |
| 8,444,359 B2 | 5/2013 | Grether et al. | |
| 9,217,452 B1 * | 12/2015 | Woodall, Jr. | F16B 13/0833 |
| 10,260,548 B2 * | 4/2019 | McClure | F16B 13/06 |
| 2002/0050105 A1 | 5/2002 | McCorkle et al. | |
| 2002/0144574 A1 | 10/2002 | Avetisian et al. | |
| 2005/0200066 A1 | 9/2005 | McClure | |
| 2009/0155014 A1 | 6/2009 | McClure | |
| 2009/0169337 A1 | 7/2009 | LaConte et al. | |
| 2009/0180831 A1 | 7/2009 | Kedall | |
| 2012/0061513 A1 | 3/2012 | Gallant et al. | |
| 2012/0225408 A1 * | 9/2012 | Moore | A61C 8/0033 |
| | | | 433/174 |
| 2012/0230796 A1 | 9/2012 | McClure | |
| 2013/0039716 A1 | 2/2013 | McClure | |
| 2013/0084130 A1 | 4/2013 | McClure | |
| 2013/0092793 A1 | 4/2013 | Braeutigam | |
| 2013/0094921 A1 | 4/2013 | McClure | |
| 2014/0086704 A1 | 3/2014 | Hemingway et al. | |
| 2019/0162225 A1 * | 5/2019 | Etling | B64C 1/1446 |

FOREIGN PATENT DOCUMENTS

| | | |
|---|---|---|
| CA | 2758594 A1 | 11/2010 |
| CA | 2755256 A1 | 3/2011 |
| CA | 2497054 C | 6/2011 |
| CA | 2476093 C | 5/2012 |
| CA | 2937937 A1 | 9/2015 |
| CN | 102171462 A | 8/2011 |
| CN | 102197231 A | 9/2011 |
| CN | 102439321 A | 5/2012 |
| CN | 102459927 A | 5/2012 |
| CN | 102171462 B | 12/2014 |
| CN | 102439321 B | 5/2015 |
| CN | 102459927 B | 5/2015 |
| EP | 1549457 A1 | 7/2005 |
| EP | 1562261 A2 | 8/2005 |
| EP | 1549457 A4 | 7/2010 |
| EP | 2324256 A2 | 5/2011 |
| EP | 2329156 A2 | 6/2011 |
| EP | 2406506 A1 | 1/2012 |
| EP | 2419649 A2 | 2/2012 |
| EP | 2406506 A4 | 10/2012 |
| EP | 2329156 A4 | 3/2013 |
| EP | 2419649 A4 | 5/2013 |
| EP | 2275692 B1 | 3/2014 |
| EP | 2733061 A1 | 5/2014 |
| EP | 1549457 B1 | 7/2014 |
| EP | 2419649 B1 | 9/2014 |
| EP | 3108148 A1 | 12/2016 |
| EP | 2406506 B1 | 1/2017 |
| FR | 2755483 B1 | 4/2004 |
| FR | 3025178 A1 | 3/2016 |
| JP | H06298186 A | 10/1994 |
| JP | 2015-96770 A | 5/2015 |
| RU | 2440278 C1 | 1/2012 |
| WO | 2004037483 A1 | 5/2004 |
| WO | 2010027439 A2 | 3/2010 |
| WO | 2010027439 A3 | 3/2010 |
| WO | 2010033149 A2 | 3/2010 |
| WO | 2010033149 A3 | 3/2010 |
| WO | 2010134946 A2 | 11/2010 |
| WO | 2010134946 A3 | 11/2010 |
| WO | 2011031283 A2 | 3/2011 |
| WO | 2013120156 A1 | 8/2013 |
| WO | 2015130533 A1 | 9/2015 |

OTHER PUBLICATIONS

Goodrich Interiors, Installation Instructions and Limitations for Model 2787 Track-Mounted Cabin Attendant Seat for Boeing 787 Aircraft, Dec. 9, 2008, 8 pages.

Avibank, New Product Bulletin for E-Nut Fastening System, Jan. 23, 2009, 5 pages.

European Patent Office, Examination Report regarding European Patent Application No. 18 177 708.7-1010, dated Sep. 16, 2019, 4 pages.

European Patent Office, Extended European Search Report on European Patent Application No. 18177708.7-1010, dated Oct. 31, 2018, 7 pages.

U.S. Patent and Trademark Office, Non-Final Office Action regarding U.S. Appl. No. 15/595,923, dated Nov. 6, 2019, 30 pages.

U.S. Patent and Trademark Office, Non-Final Office Action regarding U.S. Appl. No. 15/643,425, dated Jan. 6, 2020, 30 pages.

* cited by examiner

PROVIDE A COLLET, A PIN, A CAPNUT, AND A SUBPLATE HAVING A SUBPLATE APERTURE — 202

BOND THE SUBPLATE TO A FLOOR PANEL HAVING A PANEL APERTURE — 204

PLACE THE SUBPLATE AND A FLOOR PANEL HAVING A PANEL APERTURE ON AN AIRFRAME HAVING AN AIRFRAME APERTURE — 206

INSERT A TANG OF THE COLLET THROUGH THE PANEL APERTURE, THE SUBPLATE APERTURE, AND THE AIRFRAME APERTURE — 208

INSERT THE PIN THROUGH THE SUBPLATE APERTURE AND THE AIRFRAME APERTURE — 210

THREAD THE CAPNUT ONTO THE COLLET TO TENSION THE TANG RELATIVE TO THE SUBPLATE AND THE FLOOR PANEL — 212

FIG. 13

FLOOR PANEL FASTENER ASSEMBLY

FIELD

This disclosure relates to fasteners. More specifically, this disclosure relates to fastening systems and methods for fastening floor panels to an aircraft seat track, using what is known as a one-sided or blind fastener.

BACKGROUND

Airplane floors typically consist of honeycomb stiffened sandwich floor panels fastened to a floor structure called seat tracks. During operation of an airplane, the floor panels accommodate a variety of forces, or loads, from sources such as air pressure differences, people walking on the floor, or horizontal movement of people sitting in attached seats due to acceleration and deceleration of the plane. One function of floor panels is to transfer these loads into a body of the airplane.

A typical fastening system used for attaching the floor panels to the seat track may include a collet body having at least two fingers and a flared head, used to fasten two objects with circular apertures together, held between ends of the fingers and the head. A sleeve insert is secured in an aperture of a first object and the collet is inserted through the sleeve insert and an aperture of a second object. A screw is used to radially expand the fingers of the collet body. The fingers each include a protruding portion that engages the second object, while the head engages the first object, through the sleeve insert.

Quality control procedures have been developed to identify and correct problems that may occur when using current technology. For example, it has been found that edges of collet fingers and screw threads may be sharp enough to trim small bits of material from one another, resulting in undesirable debris. Also, it has been found that the protruding portion of a finger may sometimes expand into a gap between the flange and the seat track, rather than below the seat track as intended, which is corrected by removing and reinstalling the fastener. Cork tape is often applied to a bottom face sheet of the floor panel, surrounding a flange of each sleeve insert to dissipate forces across the floor panel and eliminate gaps between the floor panel bottom face sheet and the seat track.

SUMMARY

A fastener assembly for attaching a floor panel to an airframe is disclosed. The fastener assembly includes a collet, a pin, a capnut, and a subplate. The collet includes at least one tang, extending from a cylindrical collar that defines a collet aperture. An external thread is formed on the collar, and a tab is formed on a distal end of the tang.

The capnut has an internal cavity with an internal thread configured to mate with the collet external thread, and may have interior obstructions configured to engage with a flanged head of the pin. The pin may be sized to conform closely to the collet aperture, and is shaped to allow the pin to slide along the tang and deflect the tang.

The subplate is disposed between the floor panel and the airframe, and is attached to the floor panel using glue or other adhesive, or other attachment methods. The subplate includes an aperture aligned with an aperture in the floor panel and an aperture in the airframe. The subplate aperture may define an asymmetry about at least one line extending through a center of the aperture that interacts with the tang of the collet. In many installations, multiple subplate apertures are included, so that a single subplate extends across a large portion, or an entire expanse, of the corresponding floor panel.

In some embodiments, a subplate is not necessary. Instead, the floor panel aperture or some other structure may include an asymmetry to interact with the tang of the collet.

The collet tang extends through the floor panel aperture, the subplate aperture if present, and the airframe aperture, and interacts with the asymmetry to prevent rotation of the collet. The capnut is screwed onto the collet, such that the pin is forced to slide along and deflect the collet tang and engage the tab with the airframe.

The present disclosure provides various apparatuses and methods of use thereof. In some embodiments, a floor panel fastener assembly may include a capnut, a pin, a collet and a subplate. In some embodiments, threading the caput onto the collet may cause the pin to deflect tangs formed on the collet. In some embodiments, the collet may be installed through aligned apertures in each of a floor panel, a subplate, and an airframe.

Features, functions, and advantages may be achieved independently in various embodiments of the present disclosure, or may be combined in yet other embodiments, further details of which can be seen with reference to the following description and drawings.

DESCRIPTION

Various embodiments of a floor panel fastener assembly having a capnut, a pin, a collet, and a subplate are described below and illustrated in the associated drawings. Unless otherwise specified, the floor panel fastener assembly and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other fastener assemblies. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
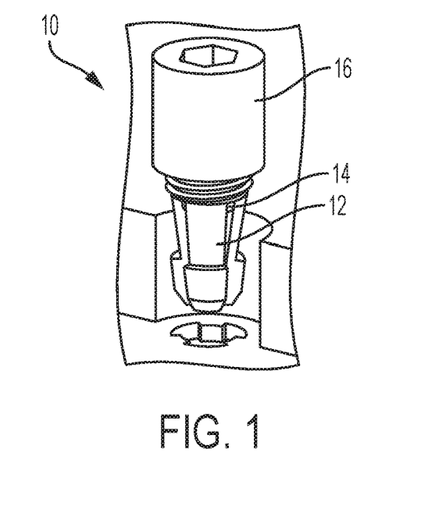
FIG. 1 is an isometric view of components of a fastener assembly according to the present disclosure.
Figure 2:
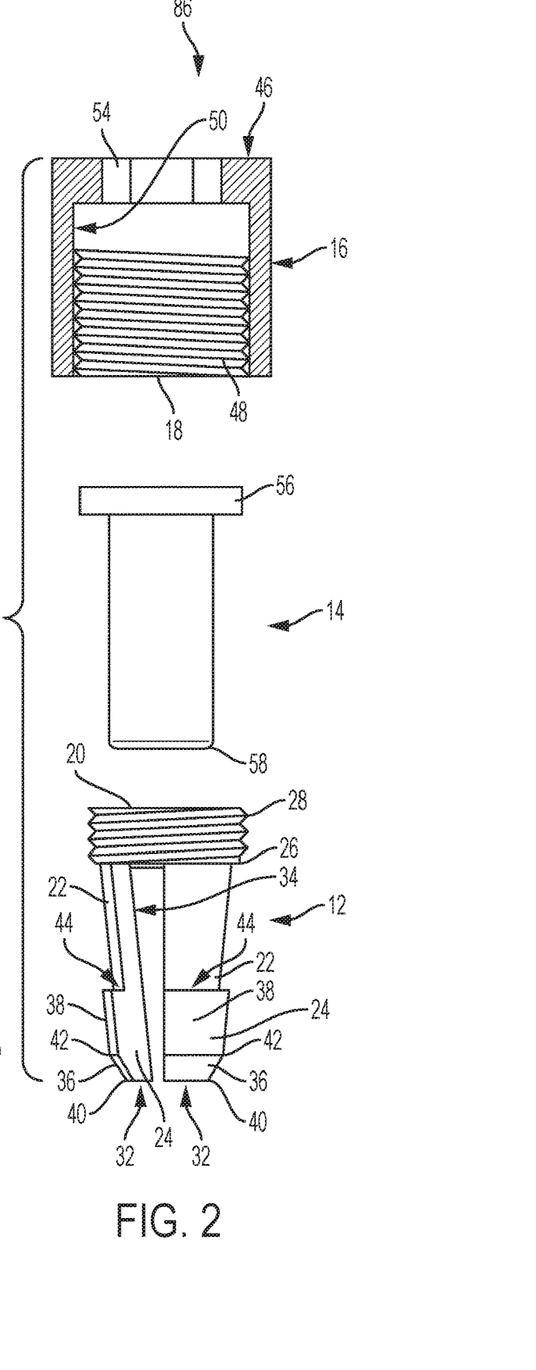
FIG. 2 is an exploded elevation view of components of a fastener assembly according to the present disclosure.

An embodiment of a fastener assembly is shown in FIG. 1, with a fastener assembly generally indicated at 10. Fastener assembly 10 includes a collet 12, a pin 14, and a capnut 16. As shown in FIG. 2, pin 14 may extend from an internal cavity 18 of capnut 16, through an aperture 20 of collet 12. The collet includes multiple tangs 22, each having a tab 24, and when installed pin 14 deflects tangs 22 in order to engage tabs 24 with a fastened structure.

Figure 4:
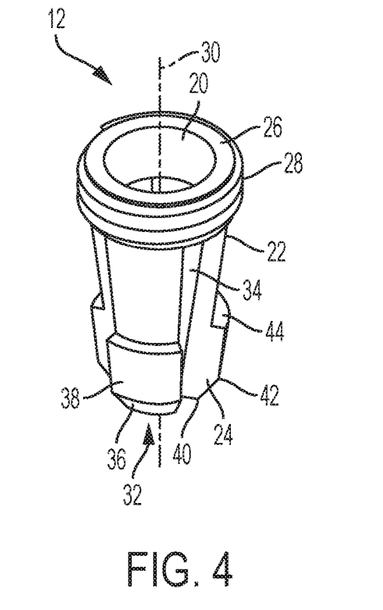
FIG. 4 is an isometric view of a collet shown in FIG. 3.
Figure 5:
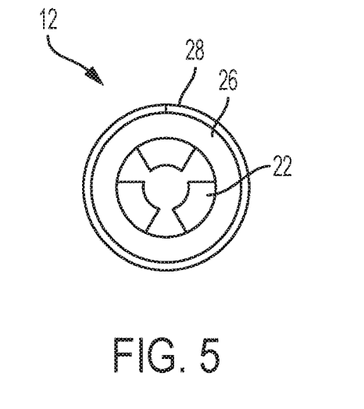
FIG. 5 is a top view of the collet shown in FIG. 3.
Figure 6:
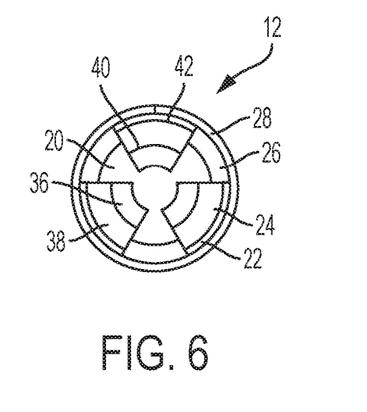
FIG. 6 is a bottom view of the collet shown in FIG. 3.

As shown in FIGS. 4-6, collet 12 has a cylindrical body, or collar 26, with an external thread 28, and multiple tangs 22 extending from the collar. In the pictured embodiment, there are three tangs, but any appropriate number of tangs may be used. For example, two tangs could be used in certain installations, and four and five tangs might be helpful in certain situations. It is believed that three tangs offer a good solution, when considering manufacturability, usability, and survivability of fastener assembly 10.

Collar 26 may define collet aperture 20 and a central axis 30. Each tang 22 may be integrally formed with collar 26 and extend from the collar to a distal end 32, generally along central axis 30. Each tang may include a substantially smooth interior bearing surface 34, facing toward central axis 30, for slidably interacting with pin 14. Such smooth-bearing interaction is unlikely to scrape material from either pin 14 or tangs 22, and thereby avoids generating unwanted debris.

A tab 24 is formed on distal end 32 of each tang 22, extending from the tang away from central axis 30. Tab 24 may comprise a wedge-shaped ramp 36 and an extended flat portion 38. Ramp 36 may extend from a narrow point 40 toward collar 26 and to a wide point 42, and flat portion 38 may be formed as part of ramp 36 and extend from wide point 42 to a shoulder 44.

Each tang 22 may extend from collar 26 in toward central axis 30, such that tabs 24 do not impede removal of collet 12 from the fastened structure. That is, tangs 22 may not be parallel with central axis 30. Instead they may be at an angle such that any extent of tabs 24, as measured along a line extending from and perpendicular to central axis 30, is less than a radius of an aperture in the fastened structure.

Figure 7:
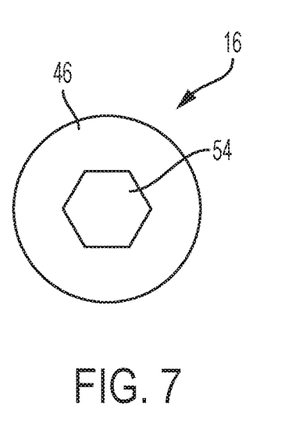
FIG. 7 is a top view of a capnut shown in FIG. 3.
Figure 8:
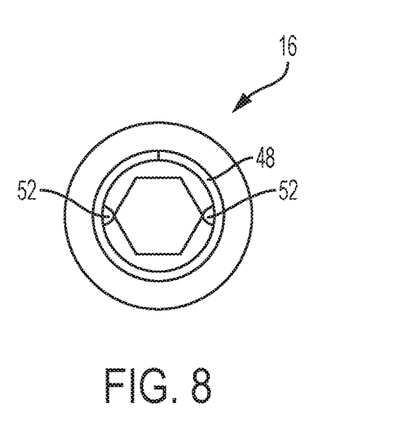
FIG. 8 is a bottom view of the capnut shown in FIG. 3.

Referring to FIGS. 7-8, capnut 16 is cylindrical in shape, with a top surface 46 and an inner cavity 18, also referred to as an internal cavity. An internal thread 48 is disposed on some portion of an inner surface 50 of the cavity, and is configured to screw onto external thread 28 of collet 12. One or more internal obstructions, dimples or intrusions may protrude from inner surface 50, adjacent one end of internal thread 48.

A tooling recess 54 may be formed in top surface 46, to facilitate use of an appropriate tool to screw capnut 16 onto collet 12. In some embodiments, tooling recess 54 may define an aperture into internal cavity 18. Any shape of tool may be used. In the drawings, a hex-shaped tooling recess 54 is shown, which works best with a hex wrench or hex driver. However, other shapes and tools could be used, as is known in the industry, such as a Phillips-head screwdriver, or a Torx driver.

Pin 14 includes a flanged head 56 and a rounded blunt end 58, as shown in FIG. 2. Flanged head 56 may be trapped in capnut internal cavity 18 by intrusions 52, such that pin 14 and capnut 16 may be manipulated as an integral unit. Pin 14 may be free to rotate relative to capnut 16, reducing friction between the pin and tangs 22 when the capnut is screwed onto collet 12.

Pin 14 extends through collet aperture 20 and collar 26 extends at least partially around the pin. Blunt end 58 is shaped for slidably engaging the substantially smooth interior bearing surfaces 34 of tangs 22, as pin 14 is forced by capnut 16. Both blunt end 58 and bearing surfaces 34 may be configured such that sliding engagement does not scrape away material from either pin 14 or tangs 22.

Pin 14 may be of sufficient length that when capnut 16 is fully screwed onto collet 12, blunt end 58 is proximate tabs 24. Blunt end 58 is of sufficient size that it deflects tangs 22 away from central axis 30, to engage shoulders 44 of tabs 24 with the fastened structure.

To put it another way, an embodiment of a fastener assembly may comprise a collet 12 with a cylindrical body 26 defining a collet aperture 20, and including a tang 22. The fastener assembly may further comprise an external thread 28 formed on collet 12 and surrounding collet aperture 20, and a capnut 16 with an internal thread 48 that mates with external thread 28. A tab 24 may be formed on a distal end 32 of tang 22, and the distal end may extend in toward a central axis 30 of collet aperture 20 such that the tab does not impede removal of collet 12 from a structure.

The fastener assembly may also comprise a pin 14 sized to conform closely to collet aperture 20, slide through the collet aperture, and slide along tang 22. Capnut 16 may be shaped to push on pin 14 and force the pin to slide along tang 22 as the capnut is screwed onto external thread 28.

However in other embodiments, not shown, pin 14 may not deflect tangs 22. For example, multiple tangs of a collet may be manufactured to extend parallel to a central axis. During installation, contact between a ramp of a tab on each tang and an aperture of a fastened structure may urge the tangs inward to allow insertion of the collet. Once the tabs are clear of the aperture, the tangs may return to a parallel position and engage the tabs with the fastened structure.

Figure 3:
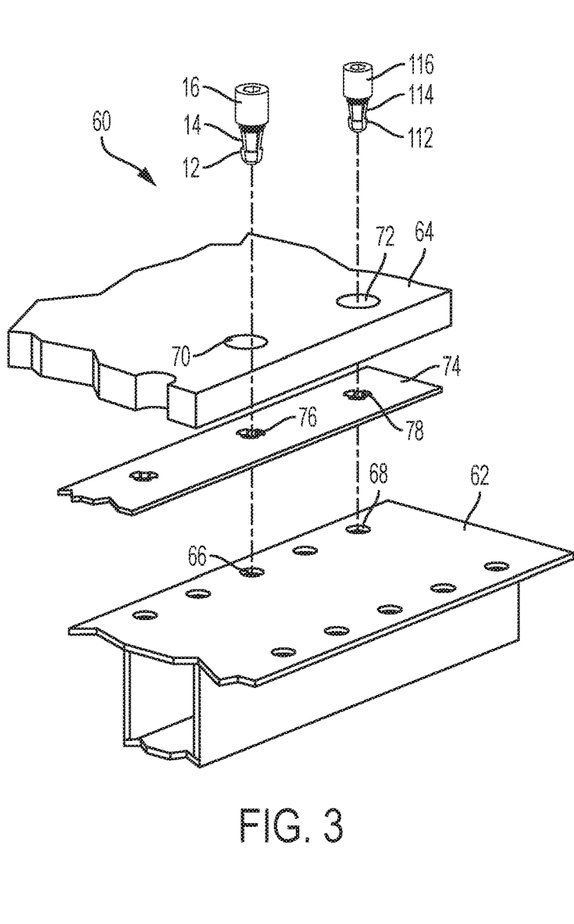
FIG. 3 is an isometric partially exploded view of components of another fastener assembly according to the present disclosure.

Another embodiment of a floor panel fastener assembly, generally indicated at 60 in FIG. 3, may comprise an airplane including a seat track, or airframe 62, and a floor panel 64 in addition to a collet 12, a pin 14, and a capnut 16 as described above.

Airframe 62 includes at least two airframe apertures 66, 68 and floor panel 64 includes at least two correspondingly spaced floor panel apertures 70, 72. Floor panel fastener assembly 60 further comprises a subplate 74, including a first aperture 76 and a second aperture 78. In the pictured embodiment there are 2 apertures in each of the floor panel and the subplate, and 10 apertures in the airframe. Any appropriate number of apertures may be included in each component. Not all floor panel apertures nor subplate apertures need to be used when attaching floor panel 64 to airframe 62.

A subplate with two or more fastened apertures may distribute loads evenly between a floor panel and a seat track, because the subplate spans between the fastened apertures without gaps that might cause concentrated loads. In some embodiments, a subplate may extend a full length of a corresponding floor panel. In other embodiments, two subplates may abut one another at a flat edge when installed, so that abutting subplates span between multiple fastened apertures without gaps.

For example, one subplate could include enough apertures to extend across an entire expanse of floor panel 64, also meaning that only a single step is required to attach multiple subplate apertures to floor panel 64. FIG. 3 shows a portion of a subplate with multiple apertures. Such a subplate may reduce both installation steps and part count for a fastener assembly.

As shown in FIG. 3, subplate 74 is sandwiched between floor panel 64 and airframe 62, and bonded to floor panel 64. Subplate aperture 76 is aligned with airframe aperture 66, and also aligned with floor panel aperture 70. Subplate aperture 78 is appropriately spaced from aperture 76 such that it may be similarly aligned with floor panel aperture 72 and also aligned with airframe aperture 68.

Figure 9:
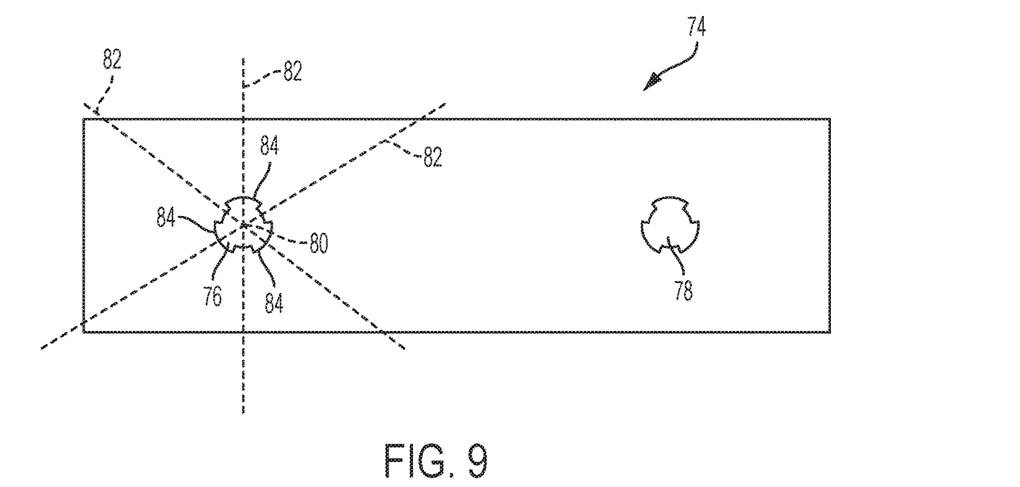
FIG. 9 is a top view of a subplate shown in FIG. 3.

Referring now to FIG. 9, subplate aperture 76 defines a center 80, and one or more lines 82 through the center may define one or more asymmetries 84. Aperture 76 is sized large enough to receive a combination of tangs 22 and pin 14, but small enough not to receive collet external thread 28. A count of the subplate asymmetries 84 for each aperture 76 may correspond to a count of tangs 22. Each subplate asymmetry 84 may be shaped to conform closely to a tang 22, and may be configured to interact with the tang 22 to limit rotation of collet 12 relative to subplate 74.

The fastener assembly may be used as a blind fastener assembly, meaning that the fastener is intended to grip a hidden structure, without visual access or tool access to any part of the fastener assembly opposite a floor panel. All manipulation and tool access is from a single side of a floor panel. By engaging tang 22 and resisting rotation of collet 12, subplate 74 allows capnut 16 to be screwed onto collet 12, even though collet 12 is completely hidden from access.

Subplate aperture 78 may match aperture 76 in size, shape, and configuration. Floor panel fastener assembly 60 may include a second capnut 116, a second pin 114, and a second collet 112, that interact with subplate aperture 78.

Figure 11:
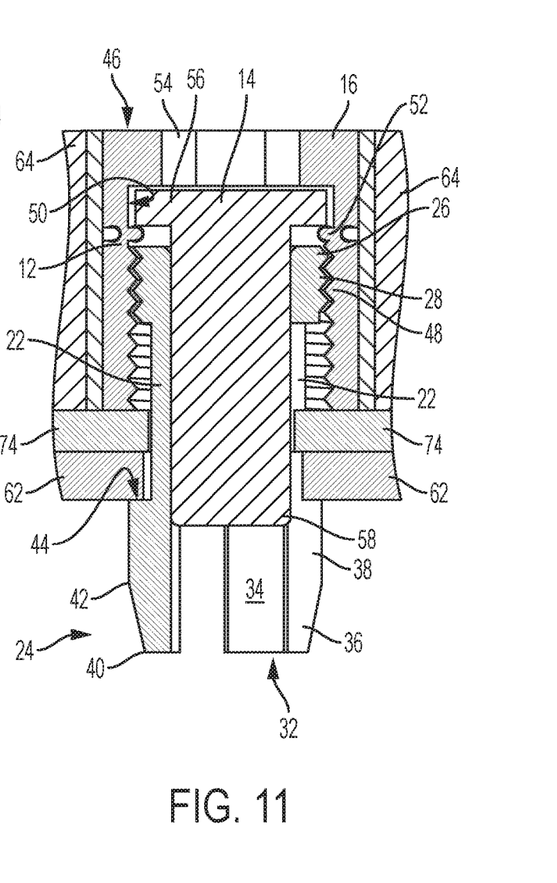
FIG. 11 is a cross-section view of the fastener assembly shown in FIG. 3, fully assembled.

Tangs 22 of collet 12 extend through floor panel aperture 70, subplate aperture 76, and airframe aperture 66, as shown in FIG. 11. Capnut 16 is screwed onto externally threaded collet 12, and thereby extends pin 14 through floor panel aperture 70, subplate aperture 76, and airframe aperture 66, to deflect tangs 22 to engage tabs 24 with a bottom surface of airframe 62.

A combination of capnut 16 screwed onto collet 12 is sized small enough to be entirely received by floor panel aperture 70. Capnut 16 may have an exterior diameter similar enough to an interior diameter of floor panel aperture 70 as to permit rotation of capnut 16, but inhibit collection of dust and grit between the capnut and floor panel 64. Capnut 16 may also be of such a height that top surface 46 is flush with floor panel 64. Thus, in such installations, fastener assembly 10 is part of a flush-mounted fastening system.

Referring again to FIG. 3, a second collet 112 may extend through floor panel aperture 72, subplate aperture 78, and airframe aperture 68. A second capnut 116 and a second pin 114 may be similarly screwed onto second collet 112, to engage the collet with a bottom surface of airframe 62. Floor panel 64 may be attached thereby to airframe 62.

In one embodiment, not pictured, a collet 12 may include exactly two tangs 22. The two tangs may be positioned radially opposite one another, and include tabs 24 to engage an airframe 62 as described above. A subplate 74 may include an aperture 76 with a slot shape. That is, aperture 76 may be generally rectangular, including two opposing flat sides and two opposing rounded sides. Or, expressed another way, aperture 76 may correspond to a cross-section of a combination of a pin 14 and the two tangs on a plane perpendicular to a central axis 30 of collet 12.

In other embodiments, a floor panel fastener assembly may not require a subplate. For example, an aperture in a floor panel may include an asymmetry. In some embodiments that asymmetry may be the slot shape previously described. One or more tangs of a collet may engage the asymmetry to prevent rotation of the collet relative to the floor panel and thereby allow a capnut to be screwed onto the collet. In such an embodiment, the floor panel may lie flat along an airframe, without gaps or concentrated loads caused by a fastener assembly.

In one such embodiment the floor panel aperture asymmetry may be formed through the full extent of the aperture. Capnut 16 and collet collar 26 may not be received by the aperture, and may instead be disposed above floor panel 64. In another such embodiment, the floor panel aperture asymmetry may be formed in a flange disposed at a lower end of the aperture. Capnut 16 and collar 26 may be received in the aperture, above the flange.

An embodiment of a fastener assembly generally indicated at 86 in FIG. 2, includes a collet 12, a pin 14, and a capnut 16. Collet 12 has an upper portion, or collar 26 presenting an external thread 28 along an exterior surface, and the upper portion defines both a collet aperture 20 and a central axis 30. At least two tangs 22 extend from collar 26 and along central axis 30. In the present embodiment 3 tangs are included, but any appropriate number of tangs may be included. A tab 24 is formed on each tang 22, and the tangs are configured to extend from collar 26 toward one another.

Pin 14 may be sized to conform closely to collet aperture 20 and is slidably held in collet 12 so that the pin extends through the collet aperture. Pin 14 slides through collet aperture 20 and along central axis 30 to deflect tangs 22 away from the central axis. Tangs 22 extend along pin 14, and each tab 24 extends from a tang 22 and away from the pin. Pin 14 may include a flanged head 56 sized large enough that it is not received by collet aperture 20, and thereby limits how far the pin may slide through the collet aperture.

This embodiment of a fastener assembly may further include a subplate 74, as shown in FIG. 9. Subplate aperture 76 is formed in subplate 74 and may be shaped to conform closely to a combination of pin 14 and tangs 22. The aperture is configured to receive tangs 22 of collet 12 when the tangs are not deflected by pin 14.

Aperture 76 defines a center 80 and three subplate asymmetries 84 about three lines 82 extending through the center 80. A count of subplate asymmetries 84 may equal a count of tangs 22, or may be any appropriate number. In the embodiment pictured in FIG. 9, subplate aperture 76 is shaped to correspond to a cross-section of a combination of pin 14 and tangs 22 on a plane perpendicular to central axis 30 and disposed between collar 26 and tabs 24.

Collet 12 and pin 14 extend through subplate aperture 76. Pin 14 bears against each tang 22 and keeps the tang engaged with a corresponding subplate asymmetry 84. Capnut 16 includes an internal cylindrical thread 48, screwed onto collet external thread 28 and trapping pin 14 in place relative to tangs 22. Capnut 16 is sized large enough not to be received by subplate aperture 76 and is therefore held on a first side of subplate 74 while tabs 24 are held on an opposite second side of the subplate.

As capnut 16 is threaded onto collet 12, the capnut is shaped to push on pin 14 and force the pin to slide along tangs 22. The collet may also experience a transferred rotational force. Tangs 22 may engage with subplate asymmetries 84 to resist the rotational force and keep collet 12 stationary relative to subplate 74.

Figure 12:
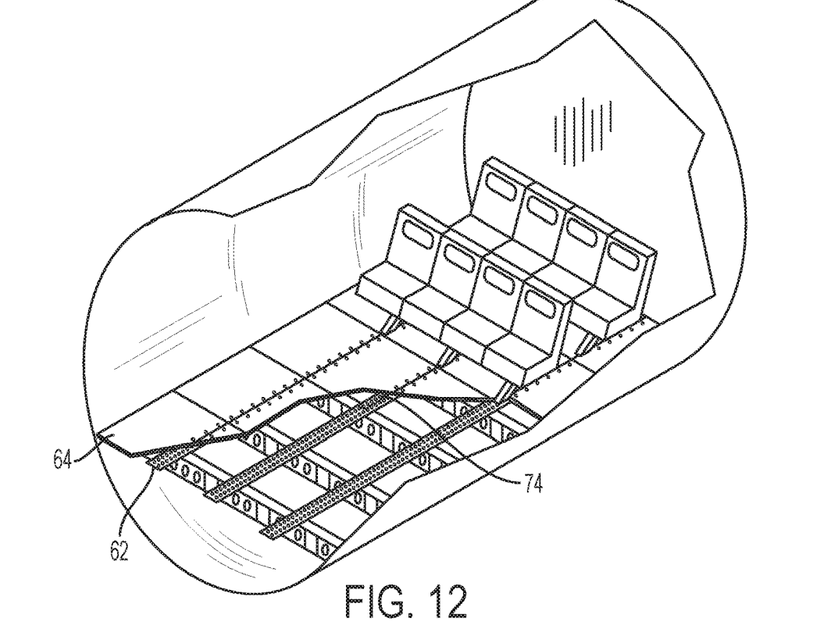
FIG. 12 is an isometric cross-sectional view of an exemplary airplane cabin.

The drawings also show an airplane in FIG. 12, with a plurality of floor panels fastened to seat tracks in a cabin section. Seat tracks extend along the longitudinal length of the airplane and floor panels span from one seat track to an adjacent track, fastened at each interface.

An airframe aperture 66 is formed in an airframe 62 and a panel aperture 70 is formed in a panel 64, aligned with airframe aperture 66. A subplate 74 is sandwiched between panel 64 and airframe 62, and bonded to the panel. A subplate aperture 76 is formed in subplate 74 and aligned with airframe aperture 66 and panel aperture 70.

Figure 10:
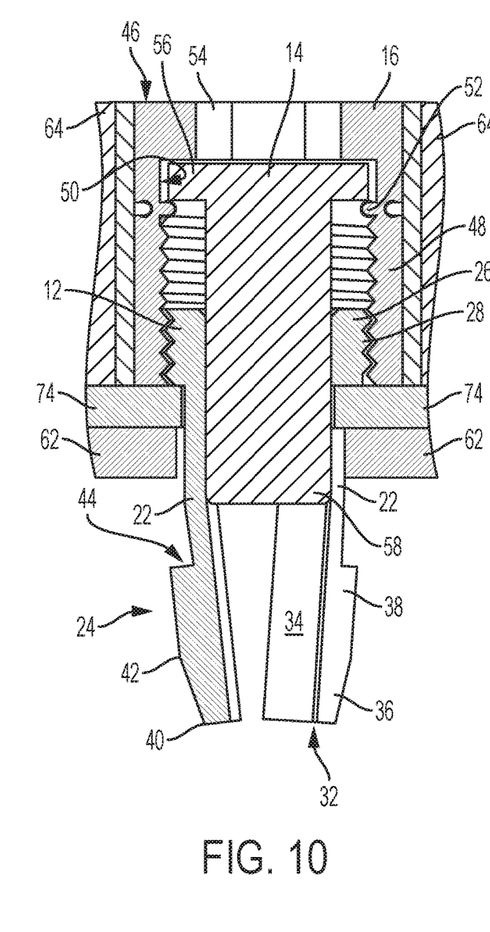
FIG. 10 is a cross-section view of the fastener assembly shown in FIG. 3, partially assembled.

FIGS. 10 and 11 show a cross-section of subplate aperture 76, airframe aperture 66, and panel aperture 70 in alignment. A collet 12 includes a tang 22 extending through airframe aperture 66, panel aperture 70, and subplate aperture 76. Tang 22 includes a tab 24 that engages with airframe 62. A pin 14 also extends through airframe aperture 66, panel aperture 60, and subplate aperture 76, bearing against tang 22 to keep tab 24 engaged with airframe 62.

Collet 12 further includes a collar 26 extending at least partially around pin 14, including an external thread 28. Collar 26 is integrally formed with tang 22 and tab 24. A capnut 16 is threaded onto external thread 28, trapping pin 14 in place relative to tang 22 so that tab 24 is engaged with airframe 62, thereby attaching subplate 74 and panel 64 to the airframe.

Tab 24 of tang 22 comprises a wedge-shaped ramp 36 at a distal end 32 of tang 22. Ramp 36 defines a ramp length progressing from a narrow point 40 farthest from collar 26 to a wide point 42 closest to the collar. Tab 24 further comprises an extended flat portion 38, formed as part of wedge-shaped ramp 36 and defining an extended length from wide point 42 of the wedge-shaped ramp to a shoulder 44 that may engage airframe 62, as shown in FIG. 11.

Tang 22 is formed with a substantially smooth interior bearing surface 34. And pin 14 includes a rounded blunt end 58 for slidably engaging substantially smooth interior bearing surface 34 without scraping away material from either pin 14 or tang 22. Collet 12 further includes a second and a third tang 22, wherein the tang, the second tang, and the third tang distribute forces radially from a central axis 30 of collar 26. The third tang can be better seen in FIGS. 4-6.

As shown in FIG. 8, capnut 16 includes a tooling recess 54 to facilitate screwing the capnut onto collet 12. Capnut 16 further includes at least one dimple 52 in an inner cavity 18. Referring again to FIGS. 10 and 11, Pin 14 includes a flanged head 56 that engages capnut 16, and dimple 52 retains the flanged head within inner cavity 18 so that pin 14 and capnut 16 may be manipulated as an integral unit.

Subplate aperture 76 defines a center 80 and defines a subplate asymmetry 84 about at least one line 82 extending through center 80. The subplate asymmetry can be seen in FIG. 9. Tang 22 interacts with subplate asymmetry 84 to limit rotation of collar 26 relative to subplate 74. Subplate aperture 76 is sized large enough to receive a combination of tang 22 and pin 14, and sized small enough not to receive external thread 28 of collet 12.

The floor panel fastener assembly may experience a variety of forces subsequent to installation in the aircraft, including shear forces perpendicular to central axis 30. Any number of tangs 22 may be included in collet 12, but three tangs are included in this embodiment and may be advantageous for resisting shear forces. Collet 12 and subplate 74 may be configured such that on average anticipated shear stresses are borne by two tangs 22, reducing stress on individual tangs. The three tangs 22 may distribute forces radially about a central axis 30.

Any appropriate material may be used for components of a floor panel fastener assembly. However, a preferred embodiment includes a capnut 16, a pin 14, and a collet 12 of stainless steel. These components may be passivated or aluminum coated. An aluminum subplate 74 is also preferred, along with a titanium seat track 62 and carbon floor panel 64. As technology improves, other materials may be identified as best suited for one or all of the components.

Figure 13:
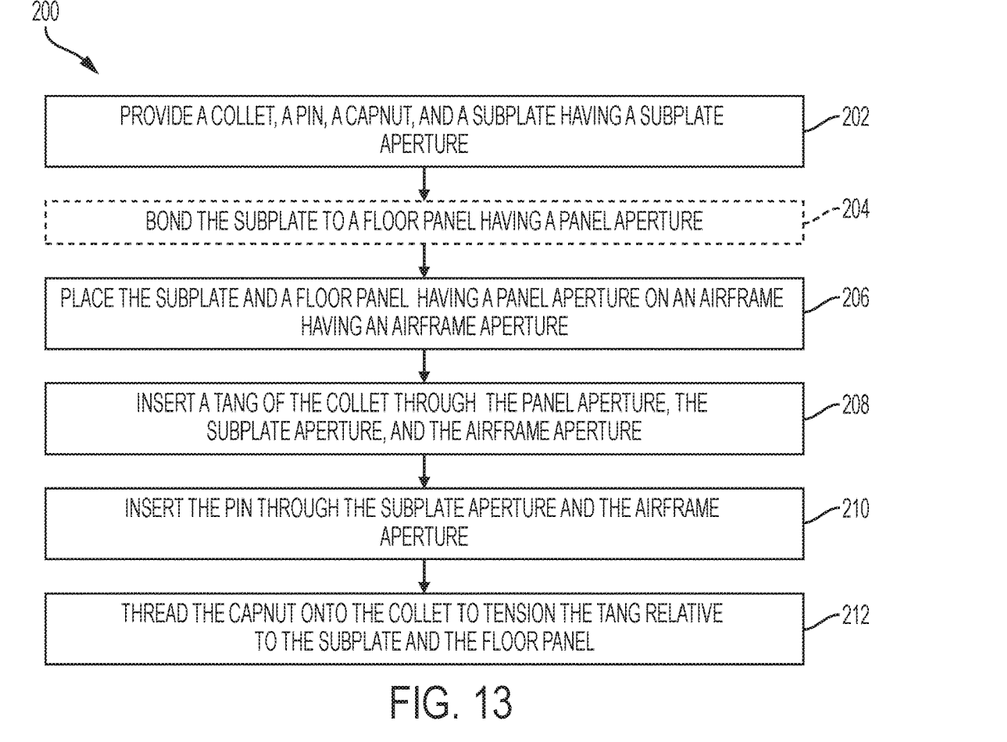
FIG. 13 is a diagrammatic representation of a flow chart illustrating a method for installing a floor panel fastener assembly.

A floor panel 64 may be attached to an airframe 62 by use of a floor panel fastener assembly. FIG. 13 describes multiple steps of a method, generally indicated at 200, for attaching a floor panel to an airframe.

Floor panel 64 may have two apertures 70, 72 spaced at a distance corresponding to a spacing of two apertures 66, 68 in airframe 62. The floor panel and airframe may include any appropriate number of apertures. In the method in FIG. 13, one of a plurality of apertures is fastened by one floor panel fastener assembly. Method 200 may be partially repeated for a subplate having two apertures as described below, or may be used with multiple floor panel fastener assemblies to fasten a plurality of floor panel and airframe apertures. The method may also be used with any number or combination of embodiments of fastener assemblies appropriate to secure a floor panel to an airframe.

In step 202 a collet 12, a pin 14, a capnut 16, and a subplate 74 are provided. Subplate 74 has apertures 76 and 78 that are aligned with apertures 70, 72 of floor panel 64. In step 204, subplate 74 is bonded to floor panel 64 in the described alignment, and without obstructing any apertures. Then in step 206 subplate 74 and floor panel 64 are placed on airframe 62.

Step 204 may be omitted, and subplate 74 may not be bonded to the floor panel. In such a case, step 206 may comprise first placing subplate 74 on the airframe and then placing floor panel 64 on the subplate. Whether step 204 is included or not, subplate 74 is sandwiched between floor panel 64 and airframe 62, and subplate apertures 76, 78 aligned with airframe apertures 66, 68.

Collet 12 includes three tangs 22 that are inserted through floor panel aperture 70 in step 208, such that the tangs extend through subplate aperture 76 and the aligned airframe aperture 66. Collet 12 further includes a collar 26 with an external thread 28, formed on tangs 22 and sized small enough to be entirely received by panel aperture 70, but sized large enough not to be received by subplate aperture 76.

In step 210 pin 14 is inserted through collar 26 of collet 12. Then in step 212 capnut 16 is screwed onto collet 12 and the capnut pushes on pin 14 and forces the pin to slide relative to the collet along a substantially smooth bearing surface 34 of each tang 22. Pin 14 is thereby inserted through subplate aperture 76, and airframe aperture 66. Tangs 22 are deflected radially outward by pin 14, relative to a central axis 30 of collet 12. An appropriate tool may be used with a tooling recess 54 formed in a top surface 46 of capnut 16 to facilitate this installation.

Each tang 22 includes a tab 24 to bear against airframe 62, and pin 14 bears against tangs 22 to keep tabs 24 engaged with the airframe. As capnut 16 is screwed onto collet 12, the collet is urged upward and tangs 22 are tensioned relative to subplate 74 and floor panel 64. That is, capnut 16 pulls up on collet 12 against a resistance from tabs 24 engaged with airframe 62, thereby putting tangs 22 under tension. When capnut 16 is fully installed onto collet 12, as shown in FIG. 11, top surface 46 may be flush with or below a top surface of floor panel 64.

In some embodiments, pin 14 may include a flanged head 56 and be trapped in an internal cavity 18 of capnut 16 by interior obstructions, or intrusions 52 engaging with the flanged head. Capnut 16 and pin 14 may then be installed together onto collet 12 by inserting pin 14 through collar 26 and screwing the capnut onto the collet.

Steps 208 through 212 of method 200 may be repeated for subplate aperture 78. A second collet 112 may be similarly inserted through floor panel aperture 72, subplate aperture 78, and airframe aperture 68. A second capnut 116 and a second pin 114 may be fully installed onto collet 112 such that the collet engages with airframe 62 and the capnut is flush with floor panel 64.

Floor panels may need to be removed for periodic maintenance or repairs to an aircraft. The floor panel fastener assembly may be removed and reinstalled as needed. The appropriate tool may be used with tooling recess 54 of capnut 16 to unscrew the capnut from collet 12.

In some embodiments as the capnut is removed, intrusions 52 may bear against flanged head 56 of pin 14 such that the pin is also removed from collet 12. In other embodiments, pin 14 may be removed subsequent to unscrewing capnut 16.

Without pin 14, tangs 22 may no longer be deflected and tabs 24 may no longer engage with airframe 62. Collet 12 may then be freely removed from airframe aperture 66, subplate aperture 76, and floor panel aperture 70.

Capnut 116, pin 114, and collet 112 may be removed by a similar method. Once all floor fastener assemblies have been removed, floor panel 64 may also be removed. If floor panel 64 is replaced, replacement subplates may be bonded to the replacement floor panel and existing collets, pins, and capnuts reinstalled.

Another embodiment of method 200 may not include a subplate. Instead a floor panel 64 may be provided, the panel having an aperture 70 including an asymmetry. In a first step, floor panel 64 may be placed on an airframe 62 including a plurality of airframe apertures. The method next comprises inserting one or more tangs 22 of a collet 12 through panel aperture 70 and a corresponding one airframe aperture 66 of the plurality of airframe apertures. Each tang 22 includes a tab 24 to bear against airframe 62 and collet 12 has an external thread 28 distal from tabs 24.

The next step is inserting a pin 14 through panel aperture 70 and corresponding airframe aperture 66, thereby holding tabs 24 of tangs 22 against airframe 62. The method then comprises threading a capnut 16 onto external thread 28 of collet 12, engaging tangs 22 with the asymmetry of panel aperture 70 to hold collet 12 stationary relative to the capnut. Tangs 22 may be thereby tensioned relative to panel 64.

The following are additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A fastener assembly comprising:
a collet with a cylindrical body defining a collet aperture, and including a tang;
an external thread formed on the collet and surrounding the collet aperture;
a pin sized to conform closely to the collet aperture, slide through the collet aperture, and slide along the tang; and
a capnut with an internal thread that mates with the external thread;
wherein the capnut is shaped to push on the pin and force the pin to slide along the tang as the capnut is screwed onto the external thread.

A2. The fastener assembly of paragraph A1, further comprising a second tang.

A3. The fastener assembly of paragraph A2, further comprising a third tang, wherein the tang, the second tang, and the third tang distribute forces radially from a central axis of the collet aperture.

A4. The fastener assembly of paragraph A1, wherein:
the tang is formed with a substantially smooth interior bearing surface; and
the pin includes a rounded blunt end for slidably engaging the substantially smooth interior bearing surface without scraping away material from either the pin or the tang.

A5. The fastener assembly of paragraph A1, wherein the capnut includes a tooling recess to facilitate screwing the capnut onto the collet.

A6. The fastener assembly of paragraph A1, wherein:
the pin includes a flanged head that engages the capnut; and
the capnut includes at least one dimple in an inner cavity that retains the flanged head within the inner cavity so that the pin and the capnut may be manipulated as an integral unit.

A7. The fastener assembly of paragraph A1, further including a tab comprising:
a wedge-shaped ramp at a distal end of the tang, the ramp defining a ramp length progressing from a narrow point farthest from the collet to a wide point closest to the collet; and
an extended flat portion formed as part of the wedge-shaped ramp, the extended flat portion defining an extended length from the wide point of the wedge-shaped ramp to a shoulder that may engage a structure.

A8. The fastener assembly of paragraph A7, wherein the distal end of the tang extends in toward a central axis of the collet aperture such that the tab does not impede removal of the collet from the structure.

A9. The fastener assembly of paragraph A7, further comprising a subplate with a subplate aperture sized smaller than the external thread of the collet.

A10. The fastener assembly of paragraph A9, wherein the subplate aperture defines a center and defines a subplate asymmetry about at least one line extending through the center, and the tang interacts with the subplate asymmetry to limit rotation of the collet relative to the subplate.

A11. The fastener assembly of paragraph A9, wherein the pin and the tang extend through the subplate aperture, with the capnut held on a first side of the subplate, and the tab held on a second side of the subplate opposite from the first side of the subplate.

B1. An airplane comprising:
an airframe;
an airframe aperture formed in the airframe;
a panel attached to the airframe;
a panel aperture formed in the panel and aligned with the airframe aperture;
a subplate sandwiched between the panel and the airframe, and bonded to the panel;
a subplate aperture formed in the subplate and aligned with the airframe aperture and the panel aperture;
a collet including a collar having an external thread and integrally formed with a tang, the tang extending through the airframe aperture, the panel aperture, and the subplate aperture, and including a tab that engages with the airframe;
a pin extending through the airframe aperture, the panel aperture, and the subplate aperture, the collar extending at least partially around the pin and the pin bearing against the tang to keep the tab engaged with the airframe;

a capnut threaded onto the external thread of the collar and trapping the pin in place relative to the tang so that the tab is engaged with the airframe, thereby attaching the subplate and the panel to the airframe.

B2. The airplane of paragraph B1, further comprising a second and a third tang wherein the tang, the second tang, and the third tang distribute forces radially from a central axis of the collar.

B3. The airplane of paragraph B1, wherein:
the tang is formed with a substantially smooth interior bearing surface; and
the pin includes a rounded blunt end for slidably engaging the substantially smooth interior bearing surface without scraping away material from either the pin or the tang.

B4. The airplane of paragraph B1, wherein the capnut includes a tooling recess to facilitate screwing the capnut onto the collar.

B5. The airplane of paragraph B1, wherein the tab comprises:
a wedge-shaped ramp at a distal end of the tang, the ramp defining a ramp length progressing from a narrow point farthest from the collar to a wide point closest to the collar; and
an extended flat portion formed as part of the wedge-shaped ramp, the extended flat portion defining an extended length from the wide point of the wedge-shaped ramp to a shoulder that may engage the airframe.

B6. The airplane of paragraph B1, wherein:
the pin includes a flanged head that engages the capnut; and
the capnut includes at least one dimple in an inner cavity that retains the flanged head within the inner cavity so that the pin and the capnut may be manipulated as an integral unit.

B7. The airplane of paragraph B1, wherein the subplate aperture is sized smaller than the external thread of the collar.

B8. The airplane of paragraph B1, wherein the subplate aperture defines a center and defines a subplate asymmetry about at least one line extending through the center, and the tang interacts with the subplate asymmetry to limit rotation of the collar relative to the subplate.

C1. A method of attaching a panel to an airframe, comprising:
sandwiching a subplate between a panel and an airframe, the subplate including a plurality of subplate apertures, and the airframe including a plurality of airframe apertures that correspond to the plurality of subplate apertures;
inserting a tang through one of the plurality of subplate apertures and a corresponding one of the plurality of airframe apertures, the tang including a tab to bear against the airframe, and an externally threaded collet distal from the tab;
inserting a pin through the one of the plurality of subplate apertures and through the corresponding one of the plurality of airframe apertures, thereby holding the tab of the tang against the airframe; and
threading a capnut onto the externally threaded collet to tension the tang relative to the subplate and the panel.

C2. The method of paragraph C1, further comprising:
inserting a second tang through a second of the plurality of subplate apertures and a corresponding second of the plurality of airframe apertures, the second tang including a second tab to bear against the airframe, and a second externally threaded collet distal from the tab;
inserting a second pin through the second of the plurality of subplate apertures and through the corresponding second of the plurality of airframe apertures, thereby holding the second tab of the second tang against the airframe; and
threading a second capnut onto the second externally threaded collet to tension the second tang relative to the subplate and the panel.

C3. The method of paragraph C1, further comprising bonding the subplate to the panel.

D1. A flush-mounted fastening system comprising:
a collet having an upper portion presenting threads along an exterior surface, said collet defining a central axis and including at least a pair of tangs extending from said upper portion along said central axis, said tangs configured to deflect toward one another for inserting said collet into a structure;
a pin configured to engage said collet along said central axis for preventing deflection of said tangs; and
a capnut defining an inner cavity having a plurality of threads disposed along an inner surface within said cavity for threadingly engaging said upper portion of said collet and securing said pin therebetween, said capnut further including a tooling recess for driving said capnut over said collet.

D2. The flush-mounted fastening system of paragraph D1, further comprising a third tang, wherein the at least a pair of tangs and the third tang distribute forces radially about the central axis.

D3. The flush-mounted fastening system of paragraph D1, further comprising:
a wedge-shaped ramp at a distal end of at least one tang in the at least a pair of tangs, the ramp defining a ramp length progressing from a narrow point farthest from the collet to a wide point closest to the collet; and
an extended flat portion formed as part of the wedge-shaped ramp, the extended flat portion defining an extended length from the wide point of the wedge-shaped ramp to a tab that may engage a structure;
wherein:
the extended flat portion is configured to deflect the distal end of the at least one tang toward another one of the at least a pair of tangs when inserting the collet into a structure; and
the extended length is at least as long as the ramp length.

D4. The flush-mounted fastening system of paragraph D1, wherein:
the at least a pair of tangs are formed with substantially smooth interior bearing surfaces; and
the pin includes a rounded blunt end for slidably engaging the substantially smooth interior bearing surfaces without scraping away material from either the pin or the at least a pair of tangs.

D5. The flush-mounted fastening system of paragraph D1, wherein:
the pin includes a flanged head that engages the capnut; and
the capnut includes at least one dimple in the inner cavity that retains the flanged head within the inner cavity so that the pin and the capnut may be manipulated as an integral unit.

D6. The flush-mounted fastening system of paragraph D1, further comprising a subplate with a subplate aperture sized large enough to receive a combination of the at least a pair of tangs and the pin, and sized small enough not to receive the threads of the collet.

D7. The flush-mounted fastening system of paragraph D6, wherein the subplate aperture defines a center and defines a subplate asymmetry about at least one line extending through the center, and the at least a pair of tangs interact with the subplate asymmetry to limit rotation of the collet relative to the subplate.

E1. A fastener assembly comprising:

a capnut with an internal cylindrical thread and an intrusion adjacent one end of the internal cylindrical thread;

a collet with an external thread threaded into the internal cylindrical thread;

a pin having an end trapped between the intrusion and the collet;

a tang formed as part of the collet and extending along the pin, the tang including a tab that extends away from the pin; and a subplate with a subplate aperture sized to conform closely to a combination of the pin and the tang;

wherein the pin and the tang extend through the subplate aperture, with the capnut held on a first side of the subplate, and the tab held on a second side of the subplate opposite from the first side of the subplate.

E2. The fastener assembly of paragraph E1, further comprising a second and third tang, wherein the tang, second tang, and third tang distribute forces radially from a central axis of the collet.

E3. The fastener assembly of paragraph E1, wherein the tab comprises:

a wedge-shaped ramp at a distal end of the tang, the ramp defining a ramp length progressing from a narrow point farthest from the collet to a wide point closest to the collet; and an extended flat portion formed as part of the wedge-shaped ramp, the extended flat portion defining an extended length from the wide point of the wedge-shaped ramp to an end that may engage a structure; and wherein the extended flat portion is configured to deflect the distal end of the tang toward a central axis of the collet when inserting the collet into a structure;

and the extended length is at least as long as the ramp length.

E4. The fastener assembly of paragraph E1, wherein:

the tang is formed with a substantially smooth interior bearing surface; and the pin includes a rounded blunt end for slidably engaging the substantially smooth interior bearing surface without scraping away material from either the pin or the tang.

E5. The fastener assembly of paragraph E1, wherein the subplate aperture is sized small enough not to receive the external thread of the collet.

E6. The fastener assembly of paragraph E1, wherein the subplate aperture defines a center and defines a subplate asymmetry about at least one line extending through the center, and the tang interacts with the subplate asymmetry to limit rotation of the collet relative to the subplate.

E7. The fastener assembly of paragraph E1, wherein the capnut includes a tooling recess to facilitate threading the capnut onto the collet.

F1. A blind fastener assembly comprising:

a subplate including a subplate aperture defining a center and defining a subplate asymmetry about at least one line extending through the center;

a tang that is sized to extend through the subplate aperture and interact with the subplate asymmetry;

a collet formed on the tang and shaped to define a collet aperture at least partially surrounded by a collet thread;

a pin slidably held in the collet so that the pin extends through the collet aperture and the subplate aperture, the pin bearing against the tang to keep the tang engaged with the subplate asymmetry; and a capnut including an internal cylindrical thread screwed onto the collet thread, and including an intrusion engaging the pin so that the pin slides relative to the collet and the tang as the internal cylindrical thread is screwed onto the collet thread.

F2. The blind fastener assembly of paragraph F1, further comprising a second and third tang, wherein the tang, second tang, and third tang distribute forces radially from a central axis of the collet aperture.

F3. The blind fastener assembly of paragraph F1, further comprising:

a wedge-shaped ramp at a distal end of the tang, the ramp defining a ramp length progressing from a narrow point farthest from the collet to a wide point closest to the collet; and an extended flat portion formed as part of the wedge-shaped ramp, the extended flat portion defining an extended length from the wide point of the wedge-shaped ramp to a tab that may engage a structure;

wherein:

the extended flat portion is configured to deflect the distal end of the tang toward a central axis of the collet aperture when inserting the collet into a structure;

and the extended length is at least as long as the ramp length.

F4. The blind fastener assembly of paragraph F1, wherein:

the tang is formed with a substantially smooth interior bearing surface; and the pin includes a rounded blunt end for slidably engaging the substantially smooth interior bearing surface without scraping away material from either the pin or the tang.

F5. The blind fastener assembly of paragraph F1, wherein the subplate aperture is sized small enough not to receive the collet thread.

F6. The blind fastener assembly of paragraph F1, wherein the capnut includes a tooling recess to facilitate screwing the capnut onto the collet.

The different embodiments of the floor panel fastener assembly described herein provide several advantages over known solutions for attaching floor panels to airframes. For example, the illustrative embodiments of the floor panel fastener assembly described herein allow one subplate to be used with a plurality of fasteners, reducing part count and better distributing loads. For another example, the illustrative embodiments include smooth surfaces that slidably engage without scraping off material and generating unwanted debris. Additionally, and among other benefits, illustrative embodiments of the floor panel fastener assembly described herein allow collet tangs to avoid false positive engagement with gaps between floor panels and airframes. No known system or device can perform these functions, particularly in airplane assembly. Thus, the illustrative embodiments described herein are particularly useful for reducing airplane construction cost. However, not all embodiments described herein provide the same advantages or the same degree of advantage.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A fastener assembly comprising:
   a collet with a cylindrical body defining a collet aperture, and including a tang;
   an external thread formed on the collet and surrounding the collet aperture;
   a pin sized to conform closely to the collet aperture, slide through the collet aperture, and slide along the tang; and
   a capnut with an internal thread that mates with the external thread;
   wherein the capnut is shaped to push on the pin and force the pin to slide along the tang as the capnut is screwed onto the external thread.

2. The fastener assembly of claim 1, further comprising a second tang.

3. The fastener assembly of claim 2, further comprising a third tang, wherein the tang, the second tang, and the third tang distribute forces radially from a central axis of the collet aperture.

4. The fastener assembly of claim 1, wherein:
   the tang is formed with a substantially smooth interior bearing surface; and
   the pin includes a rounded blunt end for slidably engaging the substantially smooth interior bearing surface without scraping away material from either the pin or the tang.

5. The fastener assembly of claim 1, wherein the capnut includes a tooling recess to facilitate screwing the capnut onto the collet.

6. The fastener assembly of claim 1, wherein:
   the pin includes a flanged head that engages the capnut; and
   the capnut includes at least one dimple in an inner cavity that retains the flanged head within the inner cavity so that the pin and the capnut may be manipulated as an integral unit.

7. The fastener assembly of claim 1, further including a tab comprising:
   a wedge-shaped ramp at a distal end of the tang, the wedge-shaped ramp defining a ramp length progressing from a narrow point farthest from the collet to a wide point closest to the collet; and
   an extended flat portion formed as part of the wedge-shaped ramp, the extended flat portion defining an extended length from the wide point of the wedge-shaped ramp to a shoulder that may engage a structure.

8. The fastener assembly of claim 7, wherein the distal end of the tang extends in toward a central axis of the collet aperture such that the tab does not impede removal of the collet from the structure.

9. The fastener assembly of claim 7, further comprising a subplate with a subplate aperture sized smaller than the external thread of the collet.

10. The fastener assembly of claim 9, wherein the subplate aperture defines a center and defines a subplate asymmetry about at least one line extending through the center, and the tang interacts with the subplate asymmetry to limit rotation of the collet relative to the subplate.

11. The fastener assembly of claim 9, wherein the pin and the tang extend through the subplate aperture, with the capnut held on a first side of the subplate, and the tab held on a second side of the subplate opposite from the first side of the subplate.

12. An airplane comprising:
    an airframe;
    an airframe aperture formed in the airframe;
    a panel attached to the airframe;
    a panel aperture formed in the panel and aligned with the airframe aperture;
    a subplate sandwiched between the panel and the airframe, and bonded to the panel;
    a subplate aperture formed in the subplate and aligned with the airframe aperture and the panel aperture;
    a collet including a collar having an external thread and integrally formed with a tang, the tang extending through the airframe aperture, the panel aperture, and the subplate aperture, and including a tab that engages with the airframe;
    a pin extending through the airframe aperture, the panel aperture, and the subplate aperture, the collar extending at least partially around the pin and the pin bearing against the tang to keep the tab engaged with the airframe;
    a capnut threaded onto the external thread of the collar and trapping the pin in place relative to the tang so that the tab is engaged with the airframe, thereby attaching the subplate and the panel to the airframe.

13. The airplane of claim 12, further comprising a second and a third tang wherein the tang, the second tang, and the third tang distribute forces radially from a central axis of the collar.

14. The airplane of claim 12, wherein:
    the tang is formed with a substantially smooth interior bearing surface; and
    the pin includes a rounded blunt end for slidably engaging the substantially smooth interior bearing surface without scraping away material from either the pin or the tang.

15. The airplane of claim 12, wherein the capnut includes a tooling recess to facilitate screwing the capnut onto the collet.

16. The airplane of claim 12, wherein:
    the pin includes a flanged head that engages the capnut; and
    the capnut includes at least one dimple in an inner cavity that retains the flanged head within the inner cavity so that the pin and the capnut may be manipulated as an integral unit.

17. The airplane of claim 12, wherein the subplate aperture defines a center and defines a subplate asymmetry about at least one line extending through the center, and the tang interacts with the subplate asymmetry to limit rotation of the collar relative to the subplate.

18. A method of attaching a panel to an airframe, comprising:
    sandwiching a subplate between a panel and an airframe, the subplate including a plurality of subplate apertures, and the airframe including a plurality of airframe apertures that correspond to the plurality of subplate apertures;
    inserting a tang through one of the plurality of subplate apertures and a corresponding one of the plurality of airframe apertures, the tang including a tab to bear against the airframe, and an externally threaded collet distal from the tab;

inserting a pin through the one of the plurality of subplate apertures and through the corresponding one of the plurality of airframe apertures, thereby holding the tab of the tang against the airframe; and threading a capnut onto the externally threaded collet to tension the tang relative to the subplate and the panel.

19. The method of claim 18, further comprising:

inserting a second tang through a second of the plurality of subplate apertures and a corresponding second of the plurality of airframe apertures, the second tang including a second tab to bear against the airframe, and a second externally threaded collet distal from the tab;

inserting a second pin through the second of the plurality of subplate apertures and through the corresponding second of the plurality of airframe apertures, thereby holding the second tab of the second tang against the airframe; and threading a second capnut onto the second externally threaded collet to tension the second tang relative to the subplate and the panel.

20. The method of claim 18, further comprising bonding the subplate to the panel.

* * * * *